(12) United States Patent
Wichary

(10) Patent No.: US 8,464,148 B1
(45) Date of Patent: Jun. 11, 2013

(54) INTELLIGENT EDITING OF WEB PAGES IN A WEB BROWSER

(75) Inventor: Marcin Kazimierz Wichary, San Francisco, CA (US)

(73) Assignee: Google Inc., Mountain View, CA (US)

( * ) Notice: Subject to any disclaimer, the term of this patent is extended or adjusted under 35 U.S.C. 154(b) by 36 days.

(21) Appl. No.: 13/172,769

(22) Filed: Jun. 29, 2011

(51) Int. Cl.
*G06F 17/00* (2006.01)

(52) U.S. Cl.
USPC ........... 715/255; 715/234; 715/237; 717/110; 717/111; 717/113

(58) Field of Classification Search
USPC .................. 715/234, 255–256; 717/110, 111, 717/113
See application file for complete search history.

(56) References Cited

U.S. PATENT DOCUMENTS

| | | | |
|---|---|---|---|
| 6,343,302 B1 * | 1/2002 | Graham | 715/205 |
| 7,000,184 B2 * | 2/2006 | Matveyenko et al. | 715/235 |
| 7,165,215 B2 * | 1/2007 | Tunning | 715/234 |
| 7,237,193 B1 * | 6/2007 | Zaky et al. | 715/207 |
| 7,316,003 B1 * | 1/2008 | Dulepet et al. | 717/111 |
| 7,331,042 B2 * | 2/2008 | Kulp et al. | 717/140 |
| 7,346,843 B2 * | 3/2008 | Hind et al. | 715/234 |
| 7,624,342 B2 * | 11/2009 | Matveyenko et al. | 715/255 |
| 7,698,631 B1 * | 4/2010 | Toebes | 715/234 |
| 7,802,179 B2 * | 9/2010 | Bissonnette et al. | 715/229 |
| 7,823,057 B1 * | 10/2010 | Schultz et al. | 715/229 |
| 7,849,440 B1 * | 12/2010 | Englehart | 717/106 |
| 7,941,748 B1 * | 5/2011 | Sundermeyer et al. | 715/255 |
| 7,971,194 B1 * | 6/2011 | Gilboa | 717/136 |
| 8,010,951 B2 * | 8/2011 | Kulp et al. | 717/140 |
| 8,020,094 B2 * | 9/2011 | Mohan | 715/255 |
| 2002/0069204 A1 * | 6/2002 | Kahn et al. | 707/10 |
| 2002/0091725 A1 * | 7/2002 | Skok | 707/501.1 |
| 2002/0152239 A1 * | 10/2002 | Bautista-Lloyd et al. | 707/513 |
| 2004/0031017 A1 * | 2/2004 | Vaidyanathan et al. | 717/110 |
| 2004/0123186 A1 * | 6/2004 | Kulp et al. | 714/38 |
| 2004/0148576 A1 * | 7/2004 | Matveyenko et al. | 715/530 |
| 2004/0215719 A1 * | 10/2004 | Altshuler | 709/204 |
| 2004/0225672 A1 * | 11/2004 | Landers et al. | 707/102 |
| 2004/0268232 A1 * | 12/2004 | Tunning | 715/513 |
| 2005/0229101 A1 * | 10/2005 | Matveyenko et al. | 715/530 |

(Continued)

OTHER PUBLICATIONS

Scott Clark; "Five Essential HTML5 Editors"; http://www.htmlgoodies.com/html5/tutorials/five-essential-html5-editors.html#fbid=AFRRiwcxwP6; 8 pages.*

(Continued)

*Primary Examiner* — Doug Hutton
*Assistant Examiner* — Benjamin Smith
(74) *Attorney, Agent, or Firm* — McDermott Will & Emery LLP

(57) ABSTRACT

Computer-implemented methods for intelligently refreshing a web page edited within another web page in a web browser are provided. In one aspect, a computer-implemented method includes receiving a request to edit a web page within a web browser, and providing, for simultaneous display within an editing web page in the web browser, a rendering of the web page to be edited and editable source code of the web page to be edited. The method also includes receiving an edit to the source code of the web page to be edited within the editing web page, determining when to refresh the rendering of the web page being edited based on the edit to the source code of the web page being edited, and controlling the refresh of the rendering of the web page being edited based on the determination. Systems and machine-readable media are also provided.

14 Claims, 10 Drawing Sheets

U.S. PATENT DOCUMENTS

| | | | |
|---|---|---|---|
| 2005/0240869 A1* | 10/2005 | Leetaru et al. | 715/530 |
| 2006/0123337 A1* | 6/2006 | Koinuma | 715/530 |
| 2006/0143562 A1* | 6/2006 | Seurig et al. | 715/513 |
| 2006/0161841 A1* | 7/2006 | Horiuchi et al. | 715/513 |
| 2007/0156772 A1* | 7/2007 | Lechner | 707/200 |
| 2008/0072164 A1* | 3/2008 | Park | 715/762 |
| 2008/0098298 A1* | 4/2008 | Lee et al. | 715/234 |
| 2008/0120538 A1* | 5/2008 | Kurz et al. | 715/255 |
| 2008/0140766 A1* | 6/2008 | Mohan | 709/203 |
| 2008/0155397 A1* | 6/2008 | Bissonnette et al. | 715/256 |
| 2008/0172608 A1* | 7/2008 | Patrawala et al. | 715/255 |
| 2008/0178046 A1* | 7/2008 | Kulp et al. | 714/38 |
| 2008/0244740 A1* | 10/2008 | Hicks et al. | 726/22 |
| 2009/0006953 A1* | 1/2009 | Perantatos et al. | 715/700 |
| 2009/0024937 A1* | 1/2009 | Lauff et al. | 715/762 |
| 2009/0055460 A1* | 2/2009 | Hicks et al. | 709/201 |
| 2010/0083102 A1* | 4/2010 | Jimenez et al. | 715/255 |
| 2012/0081389 A1* | 4/2012 | Dilts | 345/619 |

OTHER PUBLICATIONS

Gentics Software GmbH.; "Aloha Editor—The HTML5 Editor"; http://web.archive.org/web/20100722072046/http://www.aloha-editor.org/[Sep. 27, 2012 12:06:47 PM]; Jul. 22, 2010.*

"Welcome to jsFiddle"s Documentation, jsFiddle v0.5a2 Documentation, last viewed Jun. 29, 2011, retrieved from <http://doc.jsfiddle.net>, 2 pgs.

"Create a New Fiddle", jsFiddle—Online Editor for the Web, last viewed Jun. 29, 2011, retrieved from <http://jsfiddle.net>, 1 pg.

* cited by examiner

```
<slide>
<h3>Transparent colour</h3>

<code class='showcase'>
background: rgba (
<span class='value'>255</span><input type='range' min='0' max='255' value='0'>,
<span class='value'>0</span><input type='range' min='0' max='255' value='0'>,
<span class='value'>0</span><input type='range' min='0' max='255' value='0'>,
<span class='value'>0.5</span><input type='range' min='0' max='1' value='0' variant='frac'>);
</code>

<div class='showcase-preview' style='border: 3px solid #c00'>
Example
</div>
</slide>
<slide>
<h3>Transparent colour</h3>
<codearea src='examples/rgba.html' class='big large-font no-gutter'></codearea>
</slide>
```

```
function newInput () {
 var val = codeEditEl.value + "\n";

if (val != textareaValue) {
  textareaValue = val;

var match = val.match(/(.*?\n)g);

lines = [];
  lineAnnotations = {};
  lineBoundaries = [];
  var count = 0;

for (var i = 0; i < match.length; i++) {
    count += match[i].length;
    lineBoundaries.push(count);
    lines.push(match[i]);

for (var j in ANNOTATIONS) {
       if (match[i].match(new RegExp(ANNOTATIONS[j].match))) {
         lineAnnotations[i] = j;

// no break because we want the latest to supercede
         // break;
       }
    }
  } var html = [];
  for (var i = 1; i <= lines.length; i++) {
    html.push (i);
    html.push('<input title="Enable/disable this line" type="checkbox" onclick="handleCodeLineCheck(event)" line="' + i + '" ');

if(!lineDisabled[i]) {
       html.push('checked');
    }
    html.push('>');
    html.push('<br>');
  }
  codeGutterEl.innerHTML = html.join('');

updateRender(false);

displayAnnotation();
 }
 handleTextareaMove();
}
```

FIG. 3B

INTELLIGENT EDITING OF WEB PAGES IN A WEB BROWSER

BACKGROUND

1. Field

The present disclosure generally relates to the transmission of data over a network, and more particularly to the use of a computing device to provide data over a network.

2. Description of the Related Art

Source code editing, such as of HTML source code, is usually done through software specifically designed for that purpose. In certain cases, however, general purpose web browsers can load specially designed web pages that allow editing of HTML source code. Such specially designed web pages, however, require that the user manually determine when to update or "refresh" the display of the web page associated with the edited HTML source code. These web pages also do not provide any contextual GUI elements (e.g., "hints") for assisting a user in editing source code.

SUMMARY

According to one embodiment of the present disclosure, a computer-implemented method for intelligently refreshing a web page edited within an editing web page in a web browser. The method includes receiving a request to edit a web page within a web browser, and providing, for simultaneous display within an editing web page in the web browser, a rendering of the web page to be edited and editable source code of the web page to be edited. The method also includes receiving an edit to the source code of the web page to be edited within the editing web page in the web browser, determining when to refresh the rendering of the web page being edited, displayed within the editing web page in the web browser, based on the edit to the source code of the web page being edited, and controlling the refresh of the rendering of the web page being edited within the other web page based on the determination.

According to another embodiment of the present disclosure, a system for intelligently refreshing a web page edited within an editing web page in a web browser, the system includes a memory comprising a web page to be simultaneously edited and rendered for display within an editing web page in a web browser, and a processor. The processor is configured to execute instructions to receive a request to edit the web page within the web browser and provide, for simultaneous display within the editing web page in the web browser, a rendering of the web page to be edited and editable source code of the web page to be edited. The processor is also configured to execute instructions to receive an edit to the source code of the web page being edited displayed within the editing web page in the web browser, determine when to refresh the rendering of the web page being edited, displayed within the editing web page, based on the received edit to the displayed source code of the web page being edited, and control the refresh of the rendering of the web page being edited within the editing web page based on the determination.

According a further embodiment of the present disclosure, an editing web page for editing and intelligently refreshing another web page displayed within it. The editing web page includes a first portion configured to display editable source code of a web page being edited, and a second portion configured to display, simultaneously with the first portion, a rendering of the web page being edited. When an edit to the source code of the web page being edited is received within the first portion of the web page being edited, the editing web page is configured to control the refresh of the rendering of the web page being edited in the second portion based on the received edit to the source code of the web page being edited.

According yet a further embodiment of the present disclosure, a machine-readable storage medium comprising machine—readable instructions for causing a processor to execute a method for intelligently refreshing a web page edited within an editing web page in a web browser. The method includes receiving a request to edit a web page within a web browser and providing, for simultaneous display within an editing web page in the web browser, a rendering of the web page to be edited in a first frame of the editing web page, and editable source code of the web page to be edited in a second frame of the editing web page. The method also includes receiving an edit to the source code of the web page to be edited displayed in the second frame of the editing web page, determining when to refresh the rendering of the web page being edited in the first frame based on the received edit to the source code of the web page being edited in the second frame, and controlling the refresh of the rendering of the web page being edited in the first frame within the editing web page based on the determination.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 3A-3D are exemplary instructions and screenshots for intelligently refreshing a web page edited within another web page in a web browser according to certain aspects of the disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed configuration for web pages allows a user to open up any general purpose web browser, load the disclosed web page configuration ("editor web page" or "editing web page"), and then edit another web page within editor web page in the web browser. As a result, the user needs neither an application configured specifically for web page editing nor a connection to a server, because the web page can be edited offline. The user can edit a web page within the disclosed editor web page, which simultaneous displays the source code of the web page being edited and a rendering of the web page being edited. The editor web page is designed to automatically and intelligently determine when to update the rendering of the web page being edited based on any edits to its displayed source code. For instance, if the user is entering the source code tags "<b>" and "</b>" to bold text in the web page being edited, the disclosed configuration intelligently waits for the user to enter both source code tags before automatically refreshing the displayed web page so that the text is properly bolded. If the disclosed configuration did not include this feature, and refreshed the displayed web page before the user entered both tags, then the displayed web page may display an error due to the incomplete closure of the tags.

Additionally, the editor web page provides the user with contextual GUI elements for edits the user makes to source code. Returning to the previous example, when the user initially enters the first "<b>" tag, a popup GUI window can appear that indicates to the user how to use the "<b>" tag in source code and any relevant parameters for the tag. The popup GUI window appears in an appropriately determined location so as to properly display the message to the user while also not obstructing the user's interaction with the source code editing.

Although examples provided herein may describe a user's information, such as web pages designed by the user, being stored in memory, the user can, at any time, delete the user information from memory and/or opt out of having the user information stored in memory. Additionally, the user can, at any time, adjust appropriate privacy settings to selectively limit the types of user information stored in memory. The user information does not include and/or share the specific identification of the user (e.g., the user's name) unless otherwise specifically provided or directed by the user.

Figure 1:
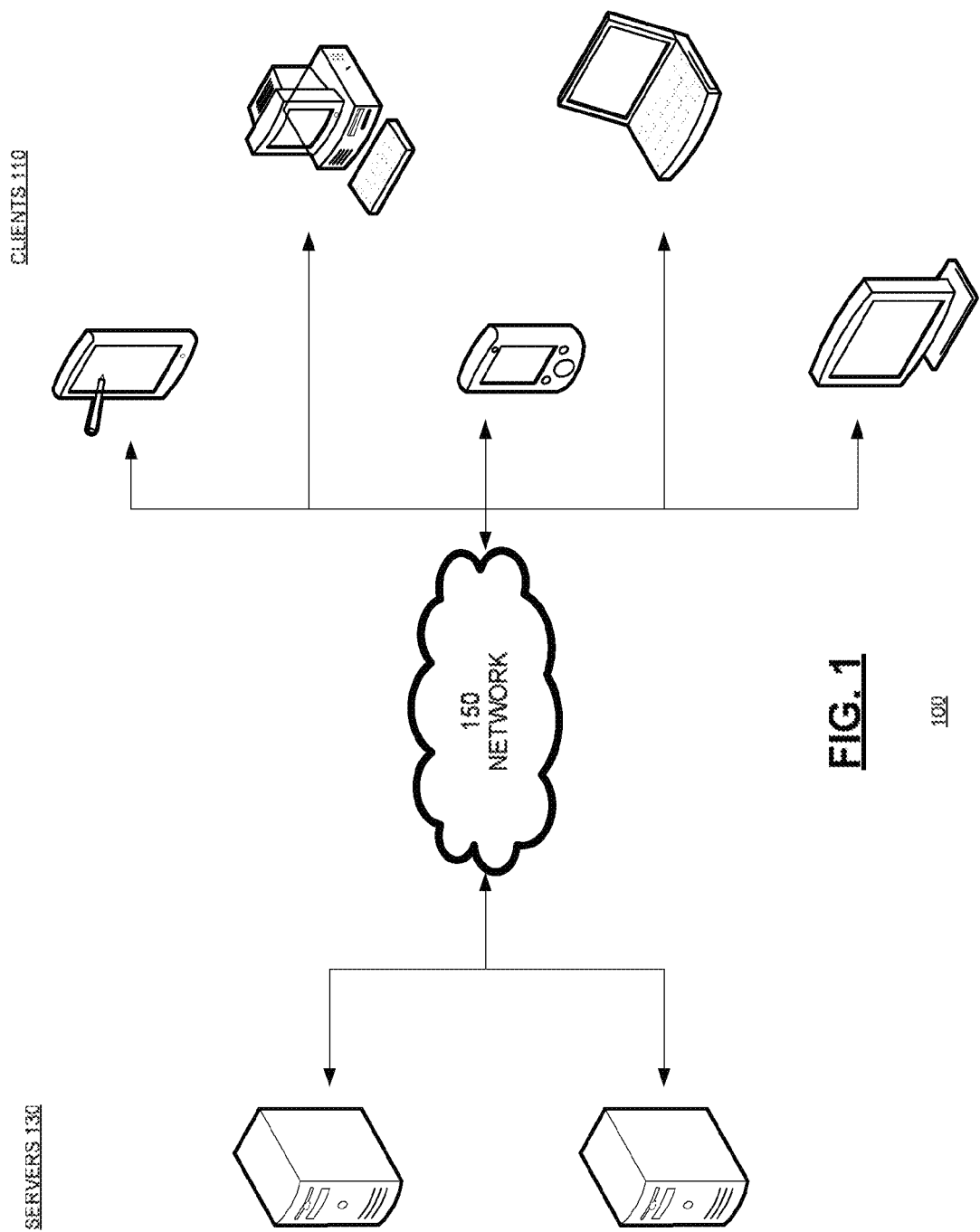
FIG. 1 illustrates an exemplary architecture for intelligently refreshing a web page edited within another web page in a web browser according to certain aspects of the disclosure.

FIG. 1 illustrates an exemplary architecture MO for intelligently refreshing a web page edited within another web page in a web browser. The architecture 100 includes servers 130 and clients 110 connected over a network 150.

One of the many servers 130 hosts a web page (the "editor web page" or "editing web page"), configured to be loaded in a web browser on a client 110, to simultaneously edit and display another web page displayed within the editor web page. For purposes of load balancing, multiple servers 130 can host the editor web page. As discussed herein, a copy of the editor web page is downloaded from the servers 130 by clients 110. When loaded in a web browser on a client 110, the editor web page allows a user to specify a web page to edit. The web page to be edited is loaded in to the editor web page, such that the source code of the web page to be edited is simultaneously displayed with a rendering of the web page to be edited, both within the editor web page in the web browser on the client 110. As the source code of the web page is edited, the concurrent rendering of the web page being edited is "intelligently" refreshed automatically such that the rendering is updated when the user has completed associated syntax or other web page edits in order to display the rendering of the web page without an error (e.g., broken HTML or CSS coding). Furthermore, as the user edits the source code of the web page being edited, graphical user interface (GUI) elements, such as pop up windows with editing hints, are displayed to the user in order to provide the user with assistance during the source code editing.

The servers 130 can be any device having an appropriate processor, memory, and communications capability for hosting the editor web page. The clients 110 to which the servers 130 are connected over the network 150 can be, for example, desktop computers, mobile computers, tablet computers, mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, hut is not limited to, any one or more of the following network topologies, including a bus network, a star network, a ring network, a mesh network, a star-bus network, tree or hierarchical network, and the like.

Figure 2:
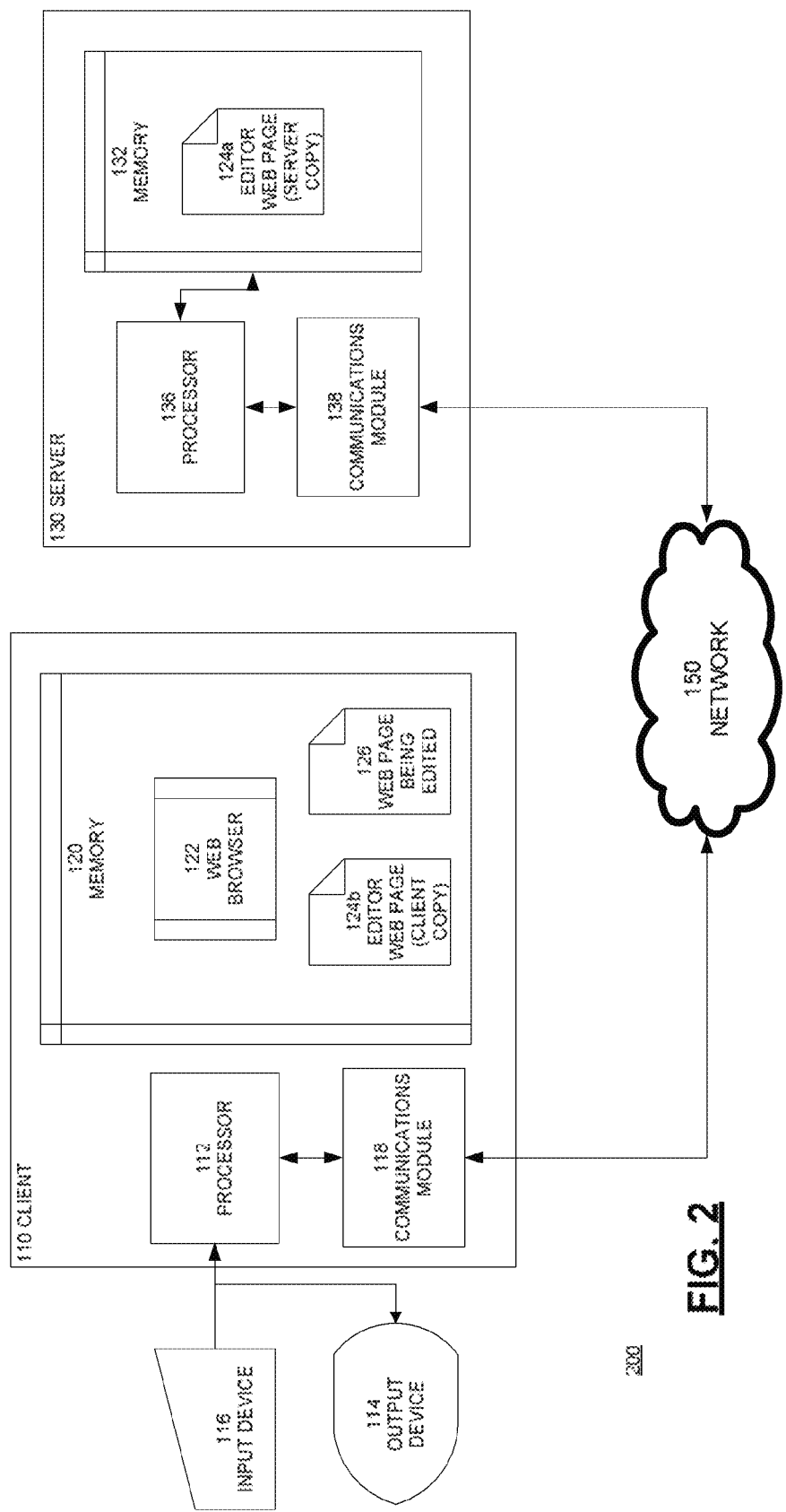
FIG. 2 is a block diagram illustrating an exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client 110 and the server 130 are connected over the network 150 via respective communications modules 118 and 138. The communications modules 118 and 138 are configured to interface with the network 150 to send and receive information, such as data, requests, responses, and commands to other devices on the network. The communications modules 118 and 138 can be, for example, modems or Ethernet cards.

The client 110 includes a processor 112, the communications module 118, and a memory 120 that includes a web browser 122, a web page to be edited 126, and a client copy of an editor web page 124b. The client copy of the editor web page 124b is obtained from the memory 132 of the server 130, which stores a server copy of the editor web page 124a. Specifically, the processor 126 of the server 130 is configured to send a copy of the editor web page 124a in response to a request for the server copy of the editor web page 124a received over the network 150 from the client 110, via the respective communications modules 118 and 138 of the client 110 and server 130. Once the copy of the editor web page 124a is received by the client 110, the client 110 stores a client copy of the editor web page 124b in memory 120.

The processor 112 of the client 110 is configured to execute instructions, such as instructions physically coded into the processor 112, instructions received from software in memory 120 (e.g., editor web page 124b), or a combination of both. For example, the processor 136 of the server 130 executes instructions to load the editor web page 124b in the web browser 122. In certain aspects, the web browser 122 is configured to process various languages, such as HyperText Markup Language 5 (HTML5), Cascading Styling Sheets (CSS) (e.g., CSS3), and JavaScript. The editor web page 124b includes instructions in various such languages for instructing the processor 112. FIG. 3A illustrates exemplary HTML5 instructions 300 included in the editor web page 124b, including a link 302 to the location of the web page to be edited 126, and FIG. 3B illustrates exemplary CSS instructions 310 of the editor web page 124b for processing an edit or modification to displayed source code. The processor 136 is configured to follow the instructions from the editor web page 124b to receive a request to edit a web page 126 within the web browser 122. For example, a user can type the location of a web page to be edited 126 into an address field of the editor web page 124b displayed using the output device 114 (e.g., a display) with an input device 116, such as a keyboard. Additionally, the user can edit the web page 126 without a network connection because both the web page being edited 126 and the editor web page 124b are stored locally in the memory 120 of the client 110.

Figure 3C:
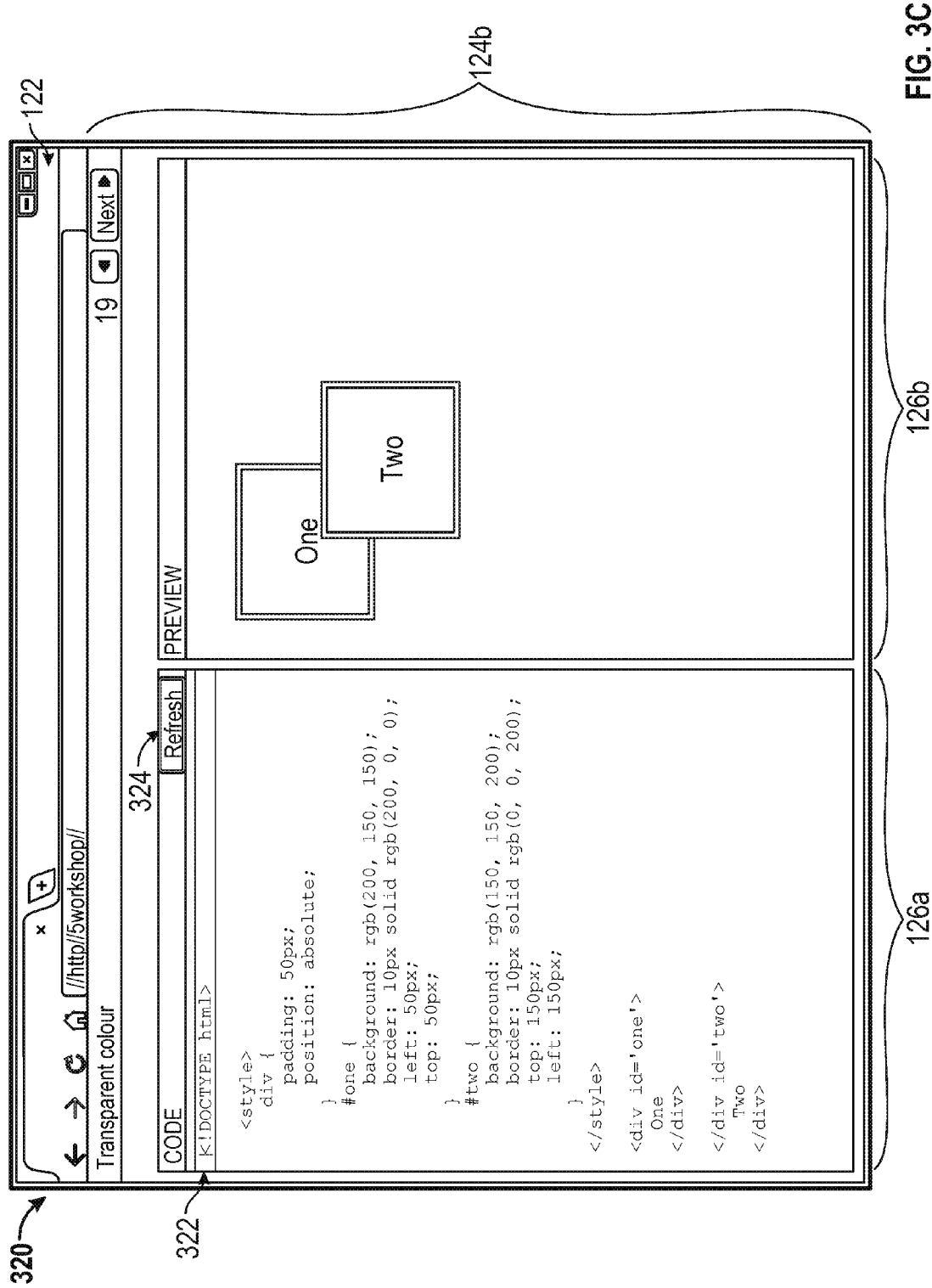

The processor 136 is also configured to provide, for simultaneous display (e.g., on output device 114) within the editor web page 124b in the web browser 122, a display of the web page being edited 1126 and a display of editable source code of the web page being edited 126. FIG. 3C illustrates an exemplary screenshot 320 of the editor web page 124b displayed within the web browser 122. As illustrated in the screenshot 320, the web page being edited 126 is displayed in an iframe 126a on the left side of the editor web page 124b and the editable source code of the web page being edited 126 is displayed in another iframe 126b on the right side of the editor web page 124b.

The processor 136 is instructed to receive an edit to the source code of the web page being edited 126 that is displayed within the editor web page 124b of the web browser 122. For example, in the exemplary screenshot 320 of FIG. 3C, the cursor 322 for editing editable source code of the web page being edited 126 is at the beginning of the editable source code. The processor 136 can determine when to refresh the display of the web page being edited 126 within the editor web page 124b based on the received edit to the displayed source code of the web page being edited 126. The determination when to refresh the display of the web page being edited 126 can be based on whether the received edit is an entry of additional source code or a deletion of existing source code. The refresh of the display of the web page being edited 126 within the editor web page 124h is based on the determination. For example, if the edit is a deletion of existing source code (e.g., a backspace), controlling the refresh of the display of the web page being edited 126 can include delaying the refresh of the display of the web page being edited 126 for a predetermined period of time (e.g., 300 ms) before refreshing the display of the web page being edited 126. The predetermined period of time can reflect a timer that is initiated by the entry of the deletion input (e.g., a pressing of the "Backspace" key on a keyboard 116). The timer can either be restarted by the entry of any other input during the predetermined period of time, or cause the display of the web page being edited 126 to be refreshed when the predetermined period of time is reached on the timer. The refresh of the display of the web page being edited 126 can be delayed for a longer period of time when the received edit is a deletion of existing source code than if the received edit is an entry of additional source code. Additionally, with reference to the exemplary screenshot 320 of FIG. 3C, although the editor web page 124b is configured to intelligently and automatically refresh the rendering of the editable source code of the web page being edited in the right-side iframe 126h, a manual refresh button 324 is provided for the user in order to manually refresh the rendering of the source code of the web page being edited 126 in the right-side iframe 126h at any time.

Figure 3D:
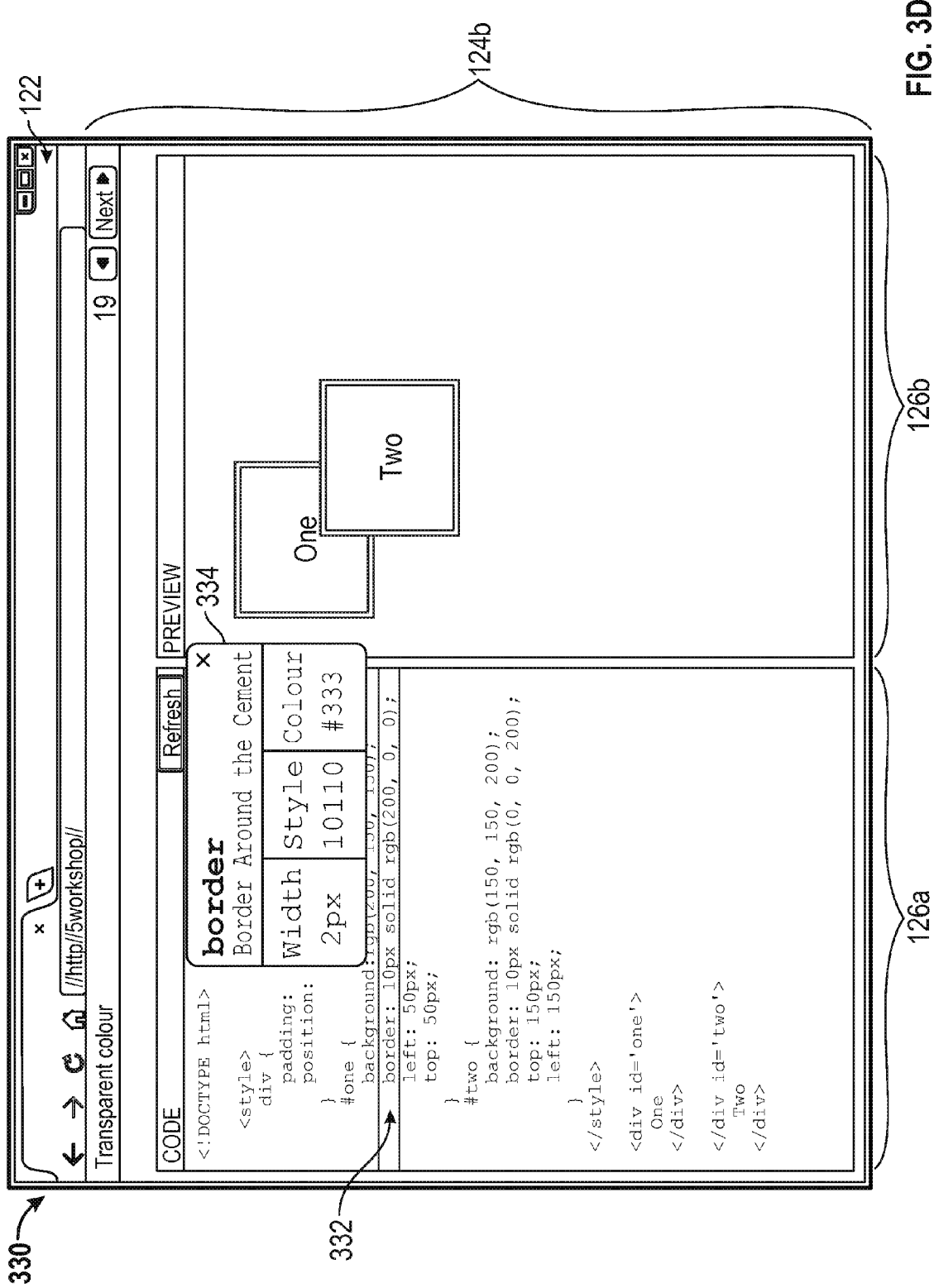

The processor 112 of the client 110 is further configured to provide a contextual graphical user interface (GHI) element for display in the editor web page 124h. The contextual GUI element can include information related to the edit of the displayed source code, such as hints to help the user edit the source code. For example, the hint can include a suggested syntax associated with the displayed source code. The GUI element can be a popup window or an iframe. FIG. 3D illustrates an exemplary screenshot 330 of the editor web page 124b that includes an exemplary contextual GUI 334. The contextual GUI 334 includes information on the HTML element "border" 332, including the purpose of the element, and examples on how to use the element. The location of the contextual GUI 334 changes based on the location of the editing cursor in order to avoid blocking the view of the user to the source code the user is editing.

Figure 4:
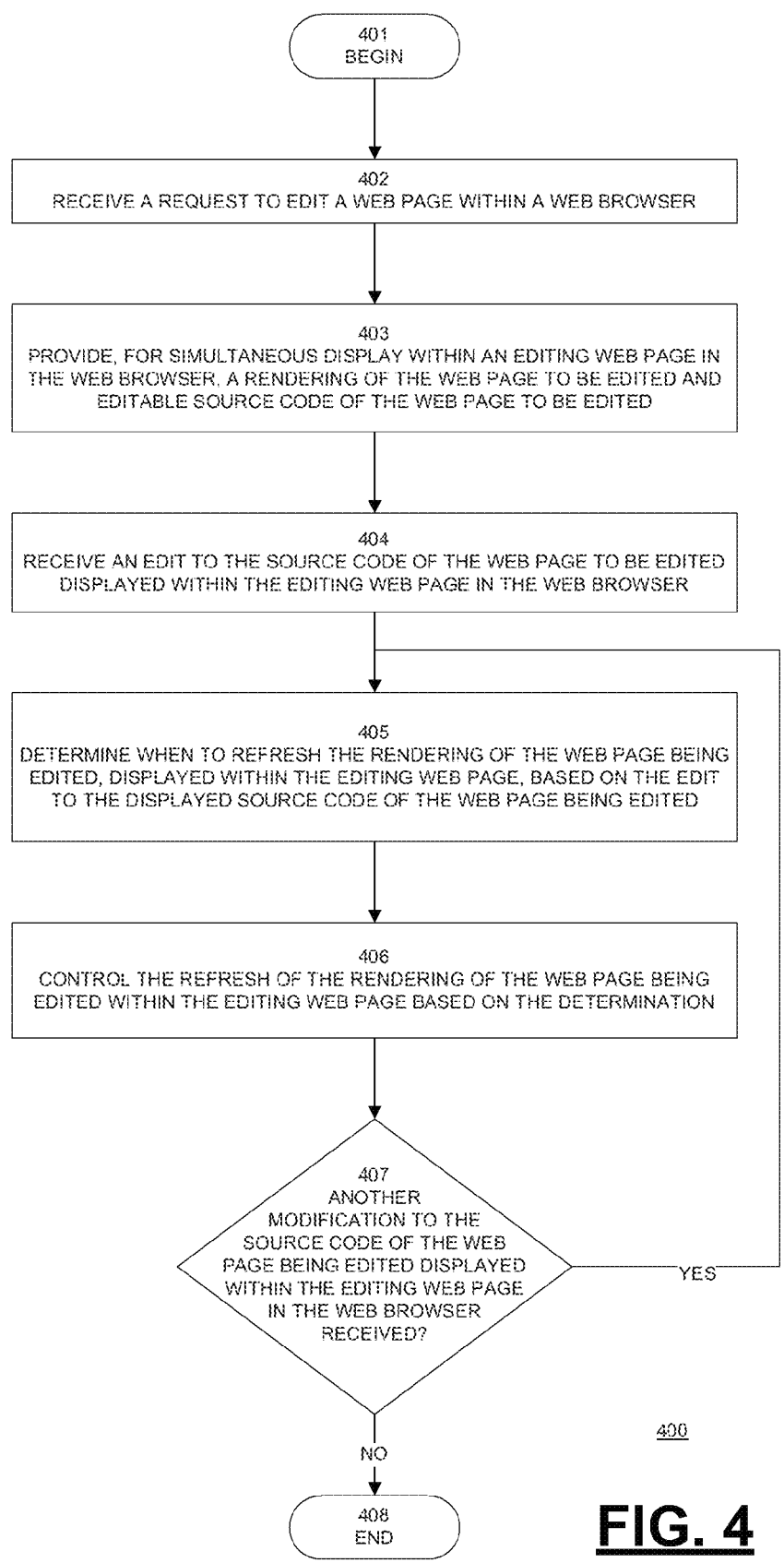
FIG. 4 illustrates an exemplary process for intelligently refreshing a web page edited within another web page in a web browser using the exemplary client of FIG. 2.

FIG. 4 illustrates an exemplary process 400 for intelligently refreshing a web page edited within another web page in a web browser using the exemplary client 110 of FIG. 2. The process 400 begins by proceeding from step 401, when a user loads a client copy of the editor web page 124b in a web browser 122 of the client 110, to step 402, when the client 110 receives a request to edit a web page 126 within the web browser 122. In step 403, a display (e.g., rendering) of the web page to be edited 126 is provided for simultaneous display within the editor web page 124b in the web browser 122, along with a display of the editable source code of the web page to be edited 126. In step 404, an edit to the editable source code of the web page to be edited 126 is received within the editor web page 124b in the web browser 222, and the processor 112 determines when to refresh the display of the web page being edited 126 within the editor web page 124b based on the received edit. In step 406, the refresh of the display of the web page being edited 126b within the editor web page 124b is controlled based on the determination of step 405. If any other edit to the source code of the web page being edited 126 are received in decision step 407, the process 400 returns to step 405, otherwise the process 400 ends in step 408.

FIG. 4 set forth an exemplary process 400 for intelligently refreshing a web page edited within another web page in a web browser using the exemplary client 110 and server 130 of FIG. 2. An example will now be described using the exemplary process 400 of FIG. 4 and a web page being edited 126 that displays two boxes. The process 400 begins by proceeding from step 401, after a user loads the client copy of the editor web page 124b in a web browser 122 of the client 110, to step 402, when the client 110 receives a request to edit a web page 126 within the web browser 122.

Figure 5A:
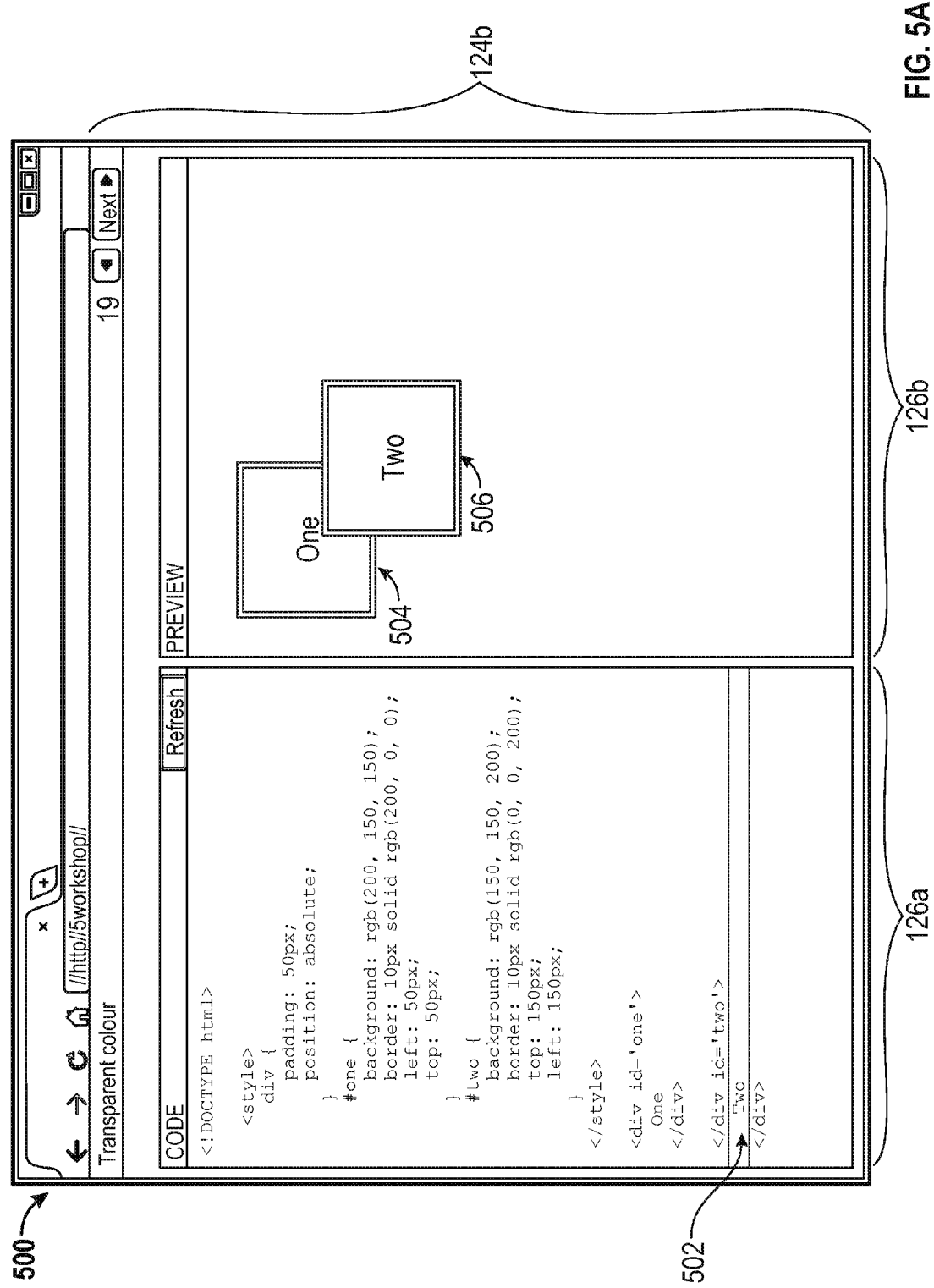
FIGS. 5A and 5B are exemplary screenshots related to the process of FIG. 4.

In step 403, a display of the web page to be edited 126 is provided for simultaneous display within the editor web page 124b in the web browser 122, along with a display of the editable source code of the web page to be edited 126, as illustrated in the exemplary screenshot 500 of the editor web page 124b in FIG. 5A. The display of the editable source code of the web page being edited is in a left iframe 126a of the editor web page 124b, and the display of the web page being edited 126 is in a right iframe 126b of the editor web page 124h. The display of the editable source code in the left iframe 126a has a user entry cursor located at the source code for the displayed word "Two" 502, and includes source code for displaying two boxes. The display of the web page being edited 126 in the right iframe 126b includes a display of the two boxes 504 and 506.

Figure 5B:
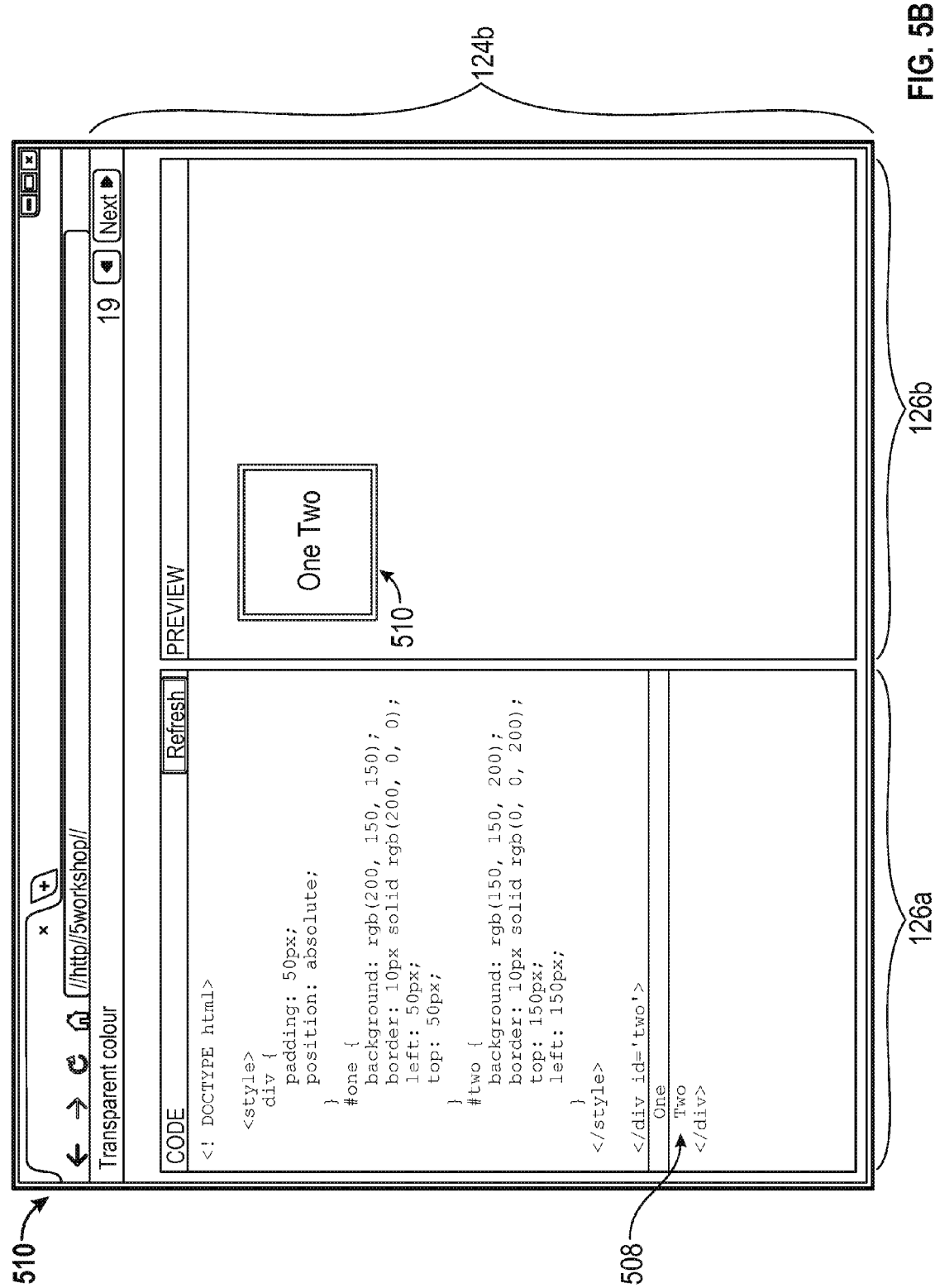

In step 404, an edit to the editable source code of the web page being edited 126 is received within the editor web page 124b in the web browser 222. The edit is a deletion of the source code delineating the two boxes. In step 405, the processor 112 determines when to refresh the display of the web page being edited 126 within the editor web page 124b based on the received edit. In step 406, the refresh of the display of the web page being edited 126b within the editor web page 124b is controlled based on the determination of step 405, as illustrated in FIG. 5B, another exemplary screenshot 510 of the editor web page 124b. The display of the editable source code in the left iframe 126a has been changed to remove the source code delineating the two boxes 508, and the display of the web page being edited 126 in the right iframe 126b has been automatically and intelligently refreshed after the user removed the source code to display one combined box 510. The process 400 ends in step 408.

Figure 6:
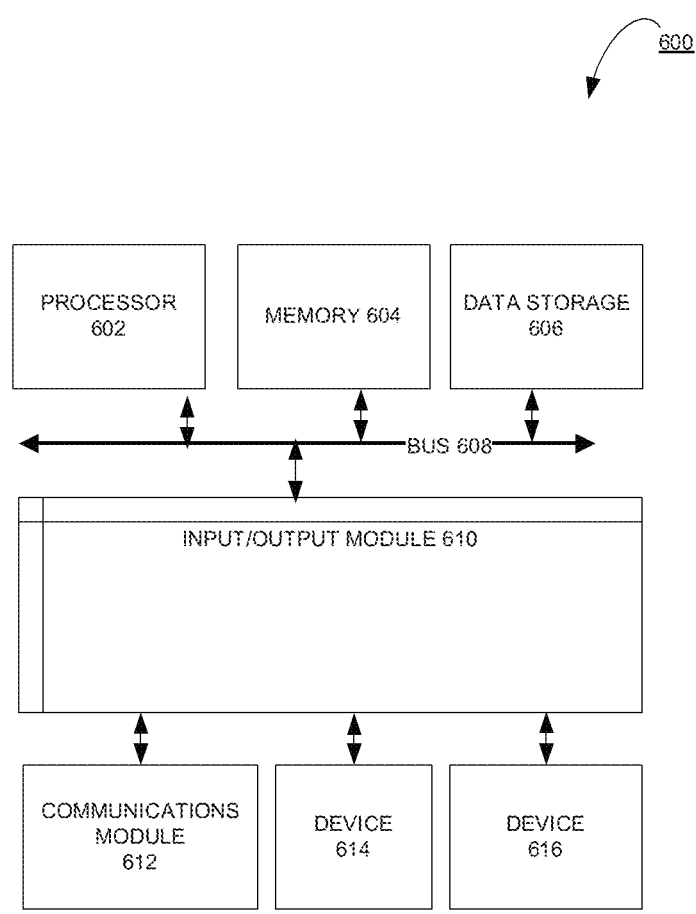
FIG. 6 is a block diagram illustrating an exemplary computer system with which the client and server of FIG. 2 can be implemented.

FIG. 6 is a block diagram illustrating an exemplary computer system 600 with which the client 110 and server 130 of FIG. 2 can be implemented. In certain aspects, the computer system 600 may be implemented using hardware or a combination of software and hardware, either in a dedicated server, or integrated into another entity, or distributed across multiple entities.

Computer system 600 (e.g., clients 110 and server 130) includes a bus 608 or other communication mechanism for communicating information, and a processor 602 (e.g., processor 112 and 136) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Arrary (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 120 and 132), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 (e.g., 118 and 138) include networking interface cards, such as Ethernet cards and modems. In certain aspects, the input/output module 610 is configured to connect to a plurality of devices, such as an input device 614 (e.g., input device 116) and/or an output device 616 (e.g., output device 114). Exemplary input devices 614 include a keyboard and a pointing device, e.g., mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 616 include display devices, such as a CRT (cathode ray tube) or LCD (liquid crystal display monitor, for displaying information to the user.

According to one aspect of the present disclosure, the client 110 and server 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, computer-implemented methods, and machine-readable media for intelligently refreshing a web page edited within another web page in a web browser have been described. A user can load an editor web page in a general purpose browser to edit a web page, thereby avoiding the need for an application specific to web page editing or maintaining a network connection. The web page being edited, once loaded in the editor web page in the web browser, is displayed simultaneously both in source code and as a rendering of the source code. When the user makes a change to the source code of the web page being edited, the rendering of the web page being edited is automatically updated in an intelligent way, thereby avoiding the display of errors in the rendering. Further, as the user makes changes to the source code, GUI elements are provided to provide hints to assist the user with editing.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in ter us of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results, in certain implementations, multitasking and parallel processing may be advantageous. Other variations are within the scope of the following claims.

These and other implementations are within the scope of the following claims.

What is claimed is:

1. A computer-implemented method for intelligently refreshing a web page edited within an editing web page in a web browser, the method comprising:
    receiving a request to edit a web page within a web browser;
    providing, for simultaneous display within an editing web page in the web browser, a rendering of the web page to be edited and editable source code of the web page to be edited;
    receiving an edit to the source code of the web page to be edited within the editing web page in the web browser;
    determining whether the received edit is an entry of additional source code, or whether the received entry is a deletion of existing source code;
    determining, in a case where the received edit is the deletion of existing source code, that a time delay for when to refresh the rendering of the web page being edited is for a predetermined period of time;
    determining, in a case where the received edit is the entry of additional source code, that the time delay for when to refresh the rendering of the web page being edited is for shorter than the predetermined period of time; and
    controlling the refresh of the rendering of the web page being edited based on the determination of the time delay.

2. The computer-implemented method of claim 1, further comprising providing a contextual graphical user interface (GUI) element for display, the contextual GUI element comprising information related to the edit of the displayed source code.

3. The computer-implemented method of claim 2, wherein the GUI element is a popup window or an iframe.

4. The computer-implemented method of claim 2, wherein the information related to the edit of the displayed source code comprises a suggested syntax associated with the displayed source code.

5. The computer-implemented method of claim 1, wherein the editing web page is encoded using HTML5.

6. The computer-implemented method of claim 1, wherein the rendering of the web page being edited is displayed within an iframe of the editing web page and the editable source of the web page being edited is displayed within an iframe of the editing web page.

7. A system for intelligently refreshing a web page edited within an editing web page in a web browser, the system comprising:
   a memory comprising a web page to be simultaneously edited and rendered for display within an editing web page in a web browser;
   a processor configured to execute instructions to:
      receive a request to edit the web page within the web browser;
      provide, for simultaneous display within the editing web page in the web browser, a rendering of the web page to be edited and editable source code of the web page to be edited;
      receive an edit to the source code of the web page being edited displayed within the editing web page in the web browser;
      determine whether the received edit is an entry of additional source code, or whether the received entry is a deletion of existing source code;
      determine, in a case where the received edit is the deletion of existing source code, that a time delay for when to refresh the rendering of the web page being edited is for a predetermined period of time;
      determine, in a case where the received edit is the entry of additional source code, that the time delay for when to refresh the rendering of the web page being edited is for shorter than the predetermined period of time; and
      control the refresh of the rendering of the web page being edited within the editing web page based on the determination of the time delay.

8. The system of claim 7, wherein the processor is further configured to provide a contextual graphical user interface (GUI) element for display, the contextual GUI element comprising information related to the edit of the displayed source code.

9. The system of claim 8, wherein the GUI element is a popup window or an iframe.

10. The system of claim 8, wherein the information related to the edit of the displayed source code comprises a suggested syntax associated with the displayed source code.

11. The system of claim 7, wherein the editing web page is encoded using HTML5.

12. The system of claim 7, wherein the rendering of the web page being edited is displayed within an iframe of the editing web page and the editable source of the web page being edited is displayed within an iframe of the editing web page.

13. A method for editing and intelligently refreshing another web page displayed within it, the method comprising:
   displaying editable source code of a web page being edited;
   displaying, simultaneously with the first portion, a rendering of the web page being edited,
   receiving an edit to the source code of the web page being edited;
   determining whether the received edit is an entry of additional source code, or whether the received entry is a deletion of existing source code;
   determining, in a case where the received edit is the deletion of existing source code, that a time delay for when to refresh the rendering of the web page being edited is for a predetermined period of time;
   determining, in a case where the received edit is the entry of additional source code, that the time delay for when to refresh the rendering of the web page being edited is for shorter than the predetermined period of time; and
   controlling the refresh of the rendering of the web page being edited based on the determination of the time delay.

14. A non-transitory machine-readable storage medium comprising machine-readable instructions for causing a processor to execute a method for intelligently refreshing a web page edited within an editing web page in a web browser, comprising:
   receiving a request to edit a web page within a web browser;
   providing, for simultaneous display within an editing web page in the web browser, a rendering of the web page to be edited in a first frame of the editing web page, and editable source code of the web page to be edited in a second frame of the editing web page;
   receiving an edit to the source code of the web page to be edited displayed in the second frame of the editing web page;
   determining whether the received edit is an entry of additional source code, or whether the received entry is a deletion of existing source code;
   determining, in a case where the received edit is the deletion of existing source code, that a time delay for when to refresh the rendering of the web page being edited is for a predetermined period of time;
   determining, in a case where the received edit is the entry of additional source code, that the time delay for when to refresh the rendering of the web page being edited is for shorter than the predetermined period of time; and
   controlling the refresh of the rendering of the web page being edited in the first frame within the editing web page based on the determination of the time delay.

* * * * *